UNITED STATES PATENT OFFICE.

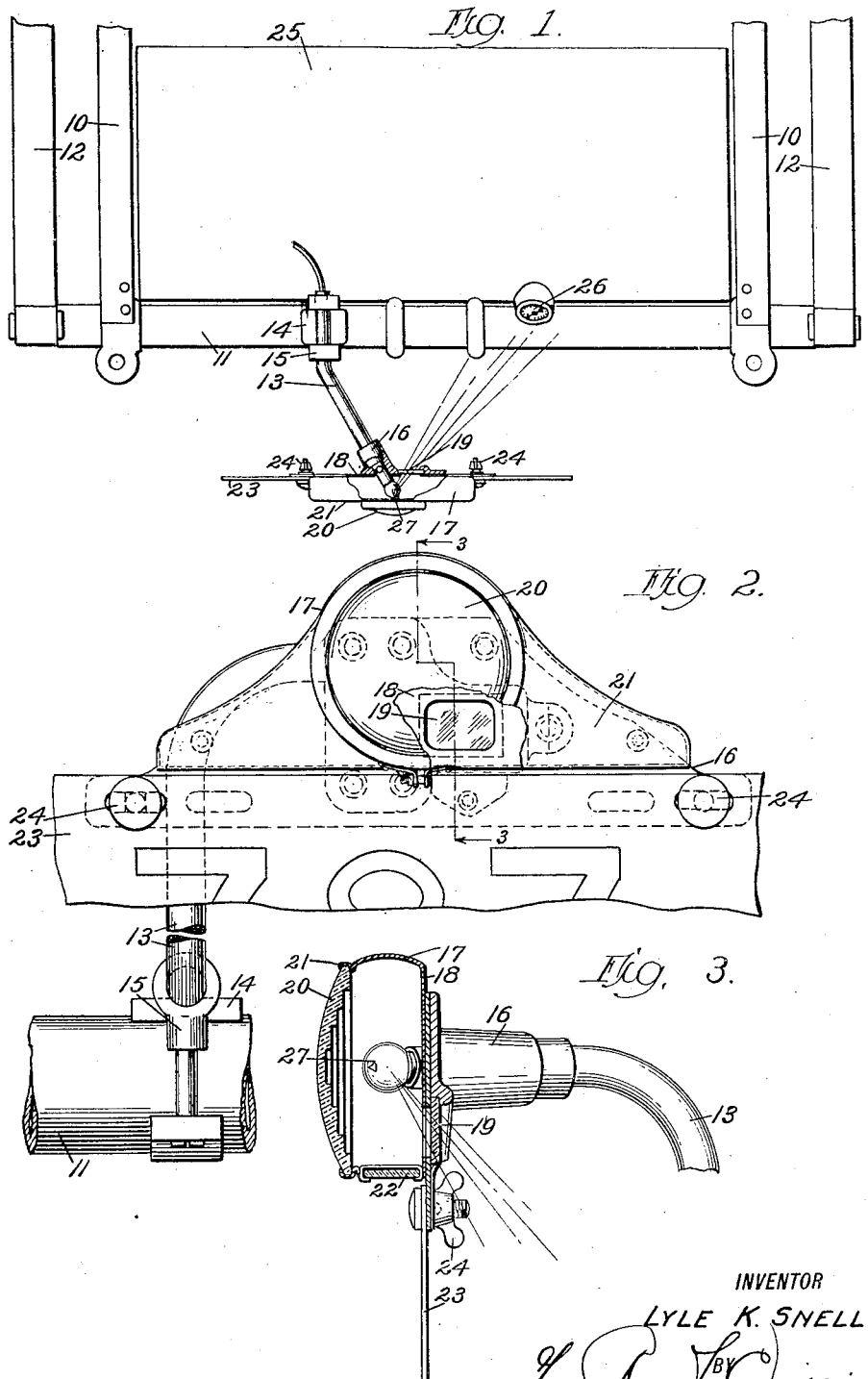

LYLE K. SNELL, OF DETROIT, MICHIGAN, ASSIGNOR TO CADILLAC MOTOR CAR COMPANY, OF DETROIT, MICHIGAN, A CORPORATION OF MICHIGAN.

VEHICLE TAIL-LAMP.

1,352,096.     Specification of Letters Patent.     Patented Sept. 7, 1920.

Application filed December 1, 1916. Serial No. 134,512.

*To all whom it may concern:*

Be it known that I, LYLE K. SNELL, a citizen of the United States, and resident of Detroit, Wayne county, State of Michigan, have invented certain new and useful Improvements in Vehicle Tail-Lamps, of which the following is a specification.

This invention relates to vehicle tail lamps, and particularly to illuminating devices adapted for use thereon.

One of the objects of this invention is to provide a comparatively simple and inexpensive lamp for satisfactorily and efficiently illuminating variously located articles.

Another object is to provide a lamp with a single source of light, such as an incandescent bulb, which will serve as a tail light and will also illuminate a license plate and a gage dial on a fuel tank mounted in proximity thereto.

These, and other objects will appear from the following description, taken in connection with the accompanying drawings, which form a part of this specification, and in which:

Figure 1 is a plan view of the rear end of a vehicle chassis embodying a form of this invention;

Fig. 2 is a rear view with portions broken away, of the lamp and its mounting illustrated in Fig. 1; and Fig. 3 is a vertical section substantially on the line 3—3 of Fig. 2.

Referring to the drawings, 10 and 11 illustrate vehicle frame side members and a rear end cross member, respectively. A pair of frame supporting springs are shown at 12.

An upwardly and rearwardly extending arm or goose neck 13, is suitably secured to the rear cross member 11, as by a pad 14 and shackles 15. A bracket 16 may have a pressed fit with the upper portion of the arm 13.

A tail lamp 17 is adapted to have its forward side wall 18 brazed or soldered to the bracket 16. The lamp is provided with a plane, clear lens 19 in a lower portion of the forward wall 18, and a suitably curved, preferably colored lens 20 is arranged in its rear wall 21 diagonally opposite the lens 19. Another clear lens 22 may be suitably mounted in the bottom of the lamp. The usual license plate 23 may be mounted below the lens 22, and secured in position on the bracket 16 by wing nuts 24.

A fuel tank 25 may be mounted in any well known manner between the rear end of the frame side members 10 and the cross member 11. A gage is adapted to be mounted in the tank with its dial 26 located at the upper rear portion thereof. It will be noted that the dial 26 is below and forwardly of the lamp 17.

A source of light in the form of an incandescent bulb 27 is obliquely mounted in the side wall 18 in such a manner that it is centrally located relative to the lens 20. It will be also noted that the lens 19 is in a plane connecting the bulb 27 and the gage dial 26. The entire arrangement is such that the direct rays of the bulb 27 will illuminate the dial 26, the license plate 23 and the tail lens 20, respectively.

While I have described and will specifically claim what I deem to be a preferred embodiment of my invention, it will be obvious to those skilled in the art that various modifications and changes may be made without departing from the scope of the claims.

Having thus described my invention, what I claim and desire to secure by Letters Patent is:

1. A vehicle tail lamp comprising a hollow casing of substantially triangular form and having substantially flat and parallel front and rear walls, a lower substantially horizontal open side within which opening a transparent member is held, and a license supporting flange or bracket depending below said opening; a lens held in place within an opening provided in the rear wall of said casing; a transparent member held in place within an opening provided in the front wall of said casing; a hollow tubular supporting member for supporting said casing from a vehicle; a lamp located adjacent the inner end of said supporting member and within said casing; and an electrical supply conductor extending through said supporting member for supplying current to said lamp.

2. In combination with a vehicle frame having a cross-member, a tail lamp comprising a hollow casing substantially triangular in form and having flat and substantially parallel front and rear walls, a lower horizontal open side within which opening a transparent member is held, and means below said opening for supporting a license plate; a lens held in place within an opening provided in the rear wall of said casing; a transparent member held in place within an opening provided in the front wall of said casing; a tubular supporting member one end of which is connected with the front wall of said casing forwardly of said lens, and the other end of which is secured to the cross-member aforesaid; a lamp located within said casing and adjacent the inner end of said tubular supporting member; and a supply conductor extending through said tubular supporting member and through which current is supplied to said lamp.

In testimony whereof I affix my signature.

LYLE K. SNELL.